May 24, 1960 W. E. RANDOLPH 2,937,839
CURVED TELESCOPING SLIDE
Filed Aug. 14, 1958 4 Sheets-Sheet 1
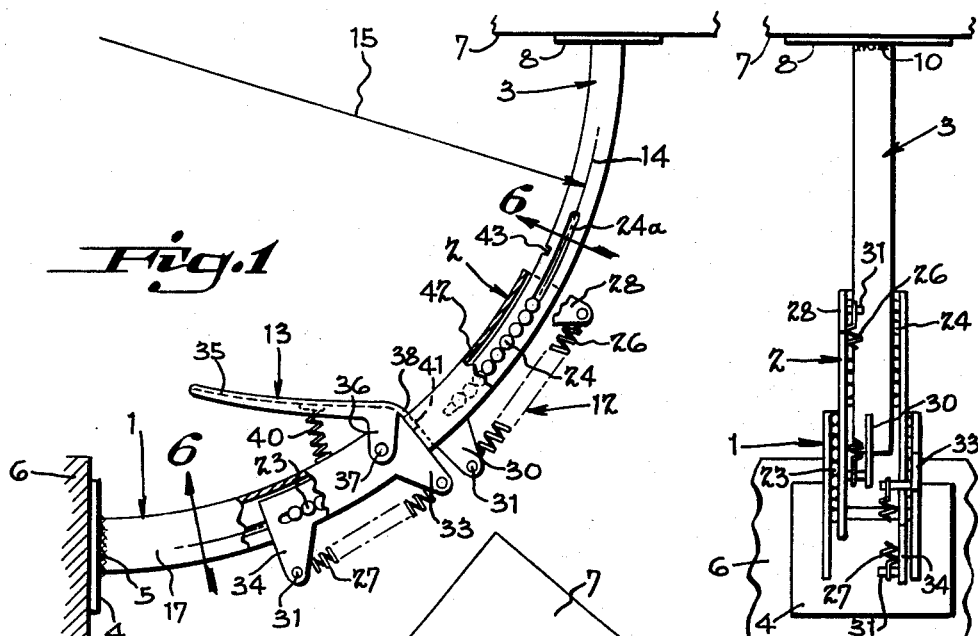
Fig.1
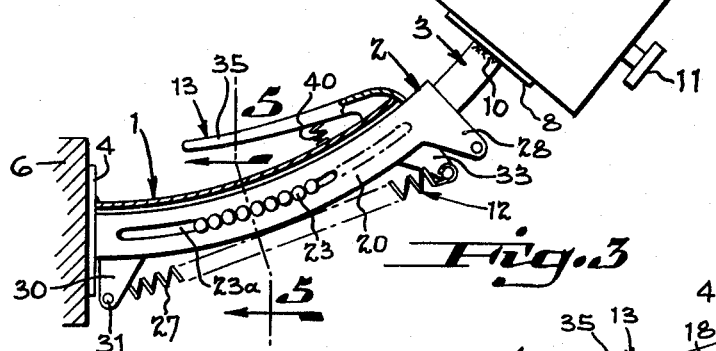
Fig.2
Fig.3
Fig.4
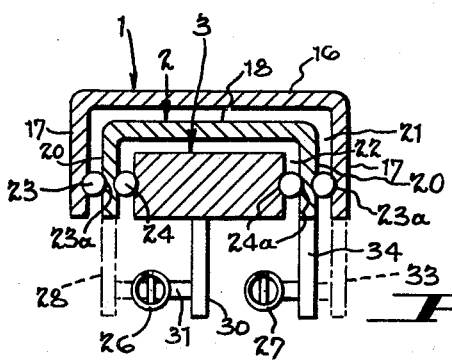
Fig.5
INVENTOR.
William E. Randolph.
BY
Wood, Herron & Evans.
ATTORNEYS.

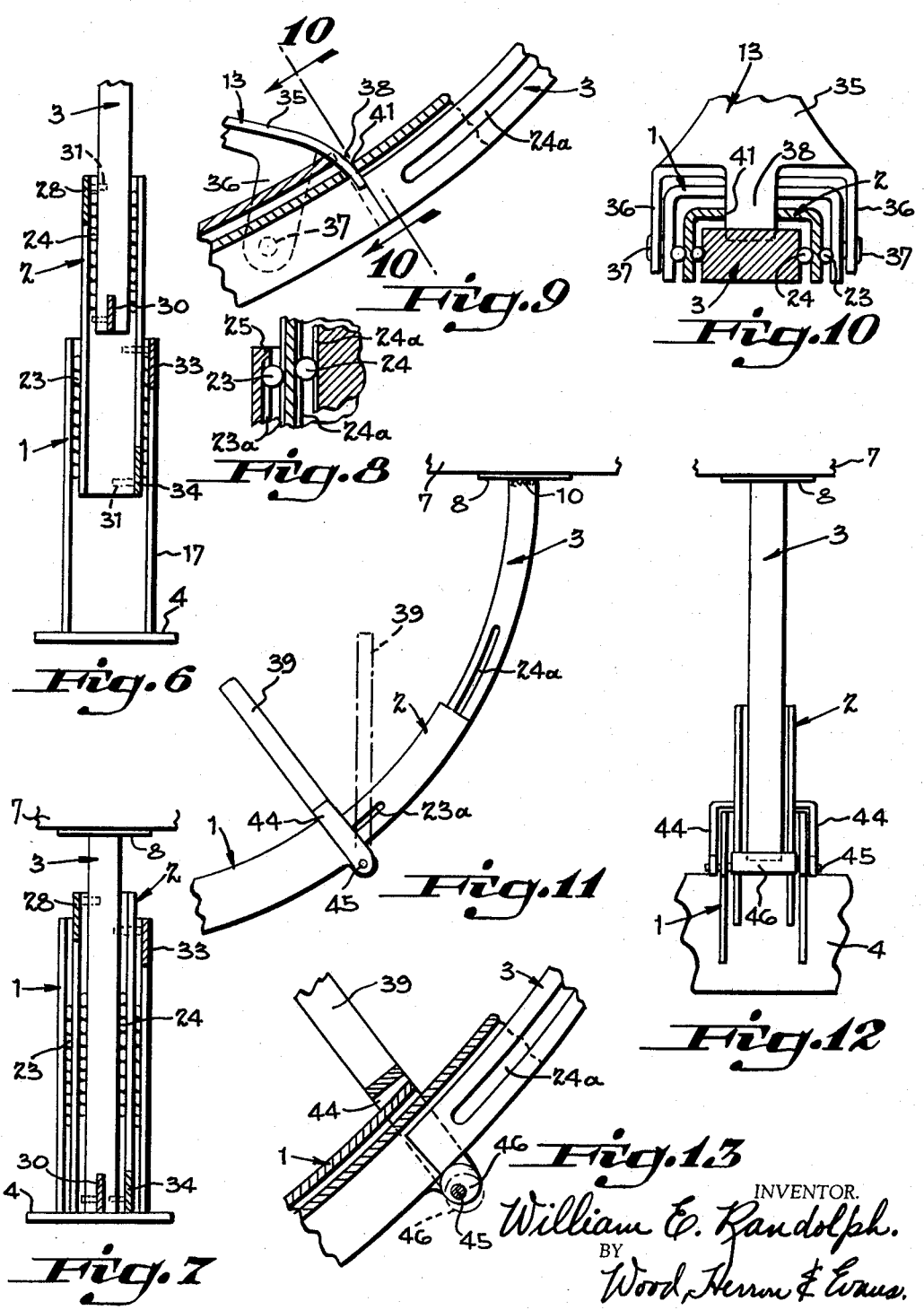

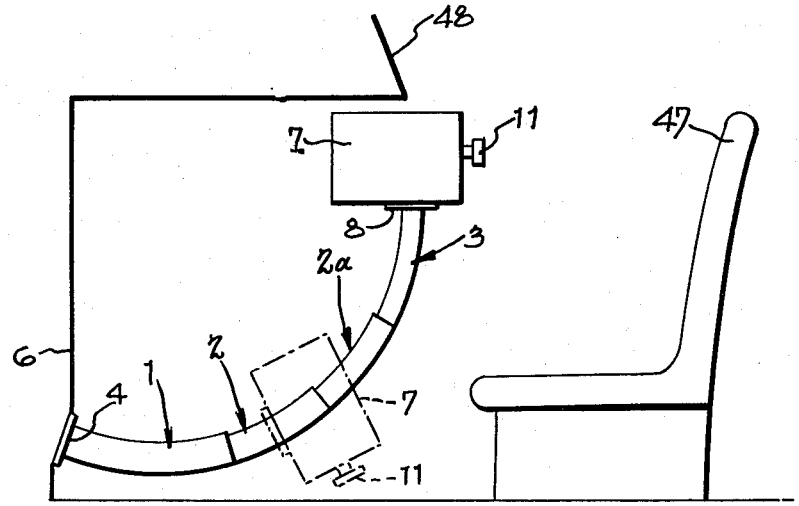
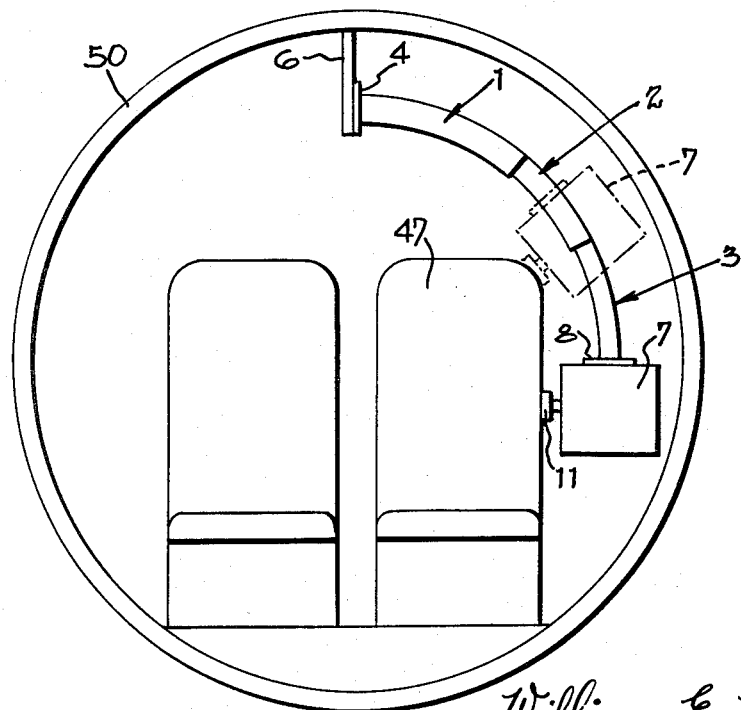

May 24, 1960 W. E. RANDOLPH 2,937,839
CURVED TELESCOPING SLIDE
Filed Aug. 14, 1958 4 Sheets-Sheet 4

INVENTOR.
William E. Randolph.
BY
Wood, Herron & Evans.
ATTORNEYS.

United States Patent Office 2,937,839
Patented May 24, 1960

2,937,839
CURVED TELESCOPING SLIDE

William E. Randolph, West Chester, Ohio, assignor to Avco Manufacturing Corporation, Cincinnati, Ohio, a corporation of Delaware Filed Aug. 14, 1958, Ser. No. 754,978

1 Claim. (Cl. 248—276)

This invention relates to telescoping extension slides which are used to guide and support a load during its motion to an extended or retracted position. Slides of this general character are well known; for example, they are conventionally used in mounting a file drawer or the like for straight line horizontal motion with respect to a cabinet. Conventional straight slides of this character are also utilized in mounting certain types of industrial equipment for motion along a horizontal line with respect to a cabinet, so as to facilitate maintenance and repair of the equipment.

A primary objective of the present invention has been to provide a telescoping slide structure arranged to guide and support a load through a curved path to an extended or retracted position, as distinguished from straight-line motion.

Another objective has been to provide a slide structure which is self-sustaining in that it supports the load in an extended or retracted position entirely free of any external guide means. In this respect, the structure differs from the conventional slide in which a portion of the slide remains constantly in tracking engagement with the fixed guide means within the cabinet or the like. Accordingly, the curved slide may be installed to project outwardly from a wall or other support surface with the load supported in cantilever fashion for arcuate movement toward or away from the wall surface.

A further objective has been to provide a self-contained slide assembly wherein a single slide assembly may be utilized to support the load, as distinguished from conventional slides in which the two parallel slides are mounted on opposite sides of the load. According to this aspect of the invention, the single slide installation effects a substantial saving in space, particularly with respect to floor space in the immediate area of the equipment. On the other hand, the curved slide is adapted to be mounted along opposite sides of the load unit for shifting it through a curved path relative to a housing or cabinet. In this type of installation, the slide structure supports the load without any interconnection with the housing structure for free access to the equipment for repairs or maintenance.

The curved slide assembly is of particular advantage in mounting various kinds of stow-away equipment in restricted quarters where the equipment is used periodically and must be stowed in an out of the way position when not in use. For example, certain pieces of equipment, such as electronic control instruments, utilized in an aircraft cockpit must occupy a position overhanging the pilot's or copilot's seat when in use, thereby creating an obstruction. In this type of installation, one end of the slide assembly may be secured to or near the floor at a point adjacent the operator's feet. When extended to the position of use, the curved slide sweeps through an arc upwardly to a point above the operator's seat, with the instrument presented to the operator for convenient manipulation. When not in use, the instrument is guided through the curved path downwardly to a position adjacent the floor. In its stowed position, the instrument may be nested compactly beneath the instrument panel or other overhanging portion of the cockpit where it offers no interference with the movements of the operator. In other instances, the slide assembly may be mounted in an overhead position, such that the instrument sweeps downwardly to its extended position and follows the curved contour of the fuselage to conserve space.

In general, the present structure comprises a stationary slide section or track and one or more movable tracks, all of which are curved in the direction of their length and telescopically interfitted one within the other. The curvature of the several tracks is generated about a common center, such that the tracks are free to shift longitudinally relative to one another through a curved path which is concentric to the common center. In order to reduce friction, the tracks are supported relative to one another by sets of ball or roller bearings which roll in tracking engagement with the interfitted tracks. Upon installation of the slide assembly, the fixed track is rigidly attached to a supporting structure, leaving the remaining tracks free to be advanced or retracted relative to one another and relative to the fixed track. The shiftable stow-away unit is mounted upon the end of the forward movable track, such that one or more intermediate movable tracks provide a telescopic connection between the fixed track and forward track when the stow-away unit is shifted to its extended position.

The angle of motion of the telescoping slide through its curved path is governed by the number of tracks which make up the assembly. In the example selected, an angle of motion somewhat greater than 30 degrees has been found ample. In the collapsed or retracted position, the several tracks telescope one within the other approximately for their full length. In the fully extended position, approximately one-half of the length of each slide is telescopically interfitted within its mating track to impart stability to the extended structure.

Since the stow-away instrument moves through a curved path, it usually is raised or lowered as it is shifted to its active or inactive position. For example, if the instrument is stowed adjacent the floor, then it will tend to shift by gravity to its lowered position. To overcome this, the slide assembly is equipped with a shiftable latching means for locking the track sections in one or more extended positions. On the other hand, if the slide assembly supports the instrument in an overhead position, then a latching device may be provided to latch the track sections in the retracted or collapsed position.

In order to bias the weight load of the instrument, the slide assembly may also be provided with counter springs arranged to counter balance the weight load of the instrument, thereby aiding in shifting the instrument to its active or inactive positions. In installations where the instrument is shifted upwardly to its active position, the counter springs are arranged to urge the track sections upwardly; in an overhead installation, the springs are arranged to urge the track sections upwardly toward the retracted position.

The various features and advantages of the invention will be more fully apparent to those skilled in the art from the following description taken in conjunction with the drawings. In the drawings:

Figure 1 is a side elevation showing the curved slide assembly in extended position.

Figure 2 is an end view projected from Figure 1, further illustrating the slide assembly.

Figure 3 is a view similar to Figure 1, showing the slide assembly in its retracted position, with the stationary slide shown in cross section to better illustrate the structural details.

Figure 4 is a view similar to Figure 3, with the stationary and intermediate slides shown in cross section.

Figure 5 is an enlarged cross sectional view taken along lines 5—5 of Figure 3, further detailing the relationship of the telescoping slides.

Figure 6 is a developed view, taken along line 6—6 of Figure 1, showing the slide in its extended position.

Figure 7 is a developed view similar to Figure 6, showing the slide in its retracted or collapsed position.

Figure 8 is an enlarged fragmentary view taken from Figure 6, illustrating the barrier or terminal of one of the ball races.

Figure 9 is an enlarged fragmentary view taken from Figure 1, detailing the latching device.

Figure 10 is a sectional view taken along line 10—10 of Figure 9, further illustrating the latching device.

Figure 11 is a side view similar to Figure 1, showing a modified latching device.

Figure 12 is an end view projected from Figure 11, further illustrating the modified latching device.

Figure 13 is an enlarged fragmentary view taken from Figure 11, detailing the eccentric roller of the latching device.

Figure 14 is a diagrammatic side view of an aircraft cockpit, showing a typical installation of the telescoping slide as a support for a retractable, stow-away control instrument.

Figure 15 is a diagrammatic cross sectional view of an aircraft fuselage, showing another installation of the telescoping slide.

*Structural details*

Figure 16:
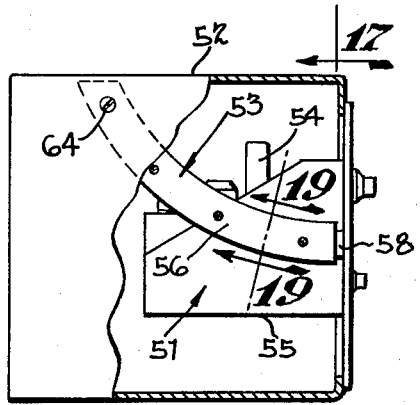
Figure 16 is a side elevation, partially broken away, showing a modified version of the curved slide which may be utilized in supporting an electronic instrument for arcuate motion relative to a cabinet.

Figures 1–7, which illustrate the principles of this invention, disclose a curved slide composed of three telescoping sections; however, the number of slide sections may be varied to suit various types of installations, as described later. Referring to Figure 1, the slide assembly comprises in general a stationary track section 1, an intermediate track section 2 and a forward track section 3. A mounting plate 4 may be welded as at 5 to the rearward end of the fixed track section 1, such that the slide assembly extends rigidly in cantilever fashion from the mounting plate. The mounting plate is attached by screws or the like (not shown) to the element 6, which represents a structural member or other suitable support at the site of installation. Several typical installations of the curved slide assembly are disclosed at a later point in this specification.

According to the present example, the stow-away instrument, such as an electronic control unit 7 (Figure 3) is mounted on the free end of the forward track section 3. For this purpose, there is provided a support plate 8 which may be welded as at 10 to the outer end of the forward track section 3, similar to mounting plate 4. The instrument 7 is suitably attached to the support plate 8 by screws or the like (not shown). In the extended or active position (for example, Figure 14), the instrument is supported in a generally horizontal position in which the controls of the instrument, indicated at 11, are presented to the operator for convenient manipulation. When the instrument is not in use, it is stowed in the inactive position shown in Figure 3, with the track sections telescopically nested within one another, as indicated. It will be noted that the curved path of travel may be increased by utilizing a greater number of telescoping tracks (Figure 14). In the structure illustrated in Figures 1–3, the instrument sweeps through an angle of approximately 40 degrees to the retracted position.

According to the example shown in Figures 1–3, the instrument is shifted to its active or inactive position by hand, and the track sections may include a counter spring arrangement 12 to bias the weight load, thereby to assist the user in extending or retracting the instrument. As indicated generally at 13, the slide assembly preferably includes a hand-operated latching device for locking it firmly in extended position, or in one or more intermediate positions within its operating range. The structural details of the counter springs and latching device are disclosed later.

As the instrument is shifted to its active or inactive position, it is guided by the telescoping slide assembly through a curved path, as indicated by the broken line 14 in Figure 1. The curved line 14 also represents the radius of the three curved track sections 1, 2 and 3, which are concentric to a common center, as indicated by the radial line 15.

Described in detail (Figure 5), the stationary track section 1 is channel-shaped in cross section, having a top web 16 and opposite side flanges 17—17. The intermediate track section 2 likewise is channel shaped, comprising a top web 18 and side flanges 20. The forward track section 3 comprises a solid bar which is rectangular in cross section. The three track sections loosely interfit one another and provide the clearances indicated at 21 and 22 in Figure 5.

In order to guide the track sections for telescopic arcuate motion with minimum frictional resistance, a set of ball bearings 23 is interposed between the stationary and intermediate tracks 1 and 2 at opposite sides. A second set of ball bearings 24 similarly is interposed between the intermediate and forward tracks at opposite sides. The ball bearings 23 are tracked in complementary grooves or race-ways 23a formed in the adjacent flanges 17 and 20 (Figures 3 and 5). The ball bearings 24 are tracked in similar race-ways 24a formed in the adjacent faces of the forward track 3 and intermediate track 2 (flanges 20), as best shown in Figures 4 and 5.

The race-ways 23a and 24a are generated in a curve which is concentric with the common center of the track sections, as indicated previously by the broken line 14 in Figure 1. The race-ways embrace the ball bearings at diametrically opposite sides to guide the track sections relative to one another laterally in their curved path of motion, thereby providing a self-sustaining slide assembly.

As best shown in Figures 1, 3 and 4, the race-ways 23a and 24a curve lengthwise through an angle slightly greater than the range of motion of the respective track sections. The ball bearings are held captive within the race-ways by respective terminals or barriers 25 (Figure 8) formed at the outer ends of the channel-shaped tracks 1 and 2. The barriers 25 may be formed by upsetting the metal at opposite ends of the channels across the race-ways after the balls are inserted therein to prevent the balls from escaping. The length of the race-ways, as delineated by the barriers, preferably is greater than the normal travel of the tracks so as to avoid interference in the normal telescoping action of the tracks. The barriers serve as stops in the event the tracks are extended beyond their normal limits.

It will be understood that the sweeping motion of the tracks will impart a rolling motion to the sets of balls; therefore, the balls will advance at a rate approximately one-half the relative motion of the tracks 2 and 3. As viewed in Figure 6, the respective sets of balls reside at the forward portions of the channel-shaped tracks 1 and 2 in the extended position of the slide assembly. As the tracks are retracted to the position shown in Figure 7 their rolling action causes the balls to advance to the mid portion of the tracks 1 and 2. During this motion, the rearward ends of the moving tracks 2 and 3 will have advanced approximately twice as far as the balls and into abutment with the mounting plate 4 (Figure 3).

In the slide assembly shown in Figures 1–5, the intermediate and forward track sections 2 and 3 are free to move independently of one another in their arcuate motion; however, their independent motion is modified by the counter spring arrangement, previously indicated at 12. In another form of the invention, the rate of advancement of the moving track sections is controlled by utilizing the rolling action of the bearing balls or rollers, as explained later.

As indicated in Figures 1–5, the counter spring structure 12 comprises two separate tension springs located at opposite sides of the slide assembly. One spring, indicated at 26, creates a tension force urging the forward track 3 outwardly with respect to the intermediate track 2. The second spring indicated at 27 urges the intermediate track outwardly with respect to the fixed track 1. Spring 26 is anchored in tension between the lugs 28 and 30. Lug 28 projects from the forward end of the intermediate track, and lug 30 projects from the rearward end of the forward track 3. The opposite ends of spring 26 are connected to the lugs by the anchor pins 31 which project laterally from the lugs. Spring 27 is anchored in tension between similar lugs 33 and 34. Lug 33 projects from the forward end of the fixed track 1, while lug 34 projects from the rearward end of the intermediate track 2. Similar pins 31 connect the opposite ends of spring 27 to the lugs.

In assembling the slide structure, the springs 26 and 27 are stretched sufficiently to exert a preload tension, with the track sections extended as shown in Figure 1. When the tracks are shifted to the retracted position of Figure 3, the springs are expanded, as indicated, and counter balance, at least partially, the weight load of the instrument 7. It will be understood that in many instances, depending upon the type of installation and weight load involved, the springs may be omitted.

The latching device 13, noted above, is mounted upon the forward end of the fixed track 1. In the form illustrated in Figures 1 and 10, the latch comprises a manually operated lever 35 having a forked end 36 straddling the fixed track section (Figure 10). The fork 36 is pivotally connected to the track section by pivot pins 37—37 projecting outwardly from opposite sides of the track. The forward end of latch lever includes a latch finger 38 having a curvature concentric to the axis of pivot pins 37.

In the retracted position of the slide (Figure 3), the forward end of finger 38 rests in sliding engagement upon the top surface of intermediate track 2. A compression spring 40, interposed between lever 35 and track 1, urges the finger in latching direction. The intermediate portion of track 2 is provided with a latch opening 41 in alignment with finger 38. Accordingly, as track section 2 reaches its extended position, finger 38 snaps through the opening to lock the track in fixed position. The forward end of the finger then rests upon the top surface of track 3 and snaps to locking position behind the end of track 3 at the outward limit of its motion; the latch thus holds both tracks in extended position as shown in Figure 9. In order to unlock the tracks, the lever 35 is depressed manually to the position of Figure 3, thus allowing the tracks to be shifted toward retracted position.

If desired, the latching mechanism may be arranged to lock the track sections in one or more intermediate positions. In the form shown in Figure 1, the intermediate track 2 includes a secondary latch opening 42 and the forward track 3 includes a secondary notch 43. The secondary opening and notch are located approximately at a mid point in the active length of the two tracks. Therefore, the latching finger 38 snaps through the opening 42 and into notch 43 to lock the tracks in partially extended position during the retracting or extending motion of the tracks.

Modified latch

The latch shown in Figures 11–13 is of the friction type and may be utilized in installations which do not require counter springs. This construction permits the instrument 7 to be locked at any desired position in its curved path of travel. As shown in Figure 11, the latch comprises a hand lever 39 having a forked portion 44 including a cross shaft 45 journalled in lugs projecting from the forward end of the stationary track 1. The opposite ends of the cross shaft 45 are keyed to the forked portion 44, and an eccentric roller 46 is carried upon the cross shaft.

As viewed in Figure 13, the periphery of eccentric 46 creates a frictional engagement with the lower surface of the intermediate track 2 and forward track 3. The clamping position of eccentric 46 is shown in full lines in Figure 13. When the lever 39 is shifted forwardly to the position shown in broken lines in Figure 11, the eccentric roller rotates to the unclamping position shown in broken lines in Figure 13, thereby releasing the tracks 2 and 3.

Single slide installations

Referring to Figure 14, the stow-away unit 7 represents a control instrument utilized in an aircraft cockpit. The slide assembly which is illustrated diagrammatically, guides the instrument 7 in its curved path with respect to the operator's seat, which is indicated at 47. In the extended position shown in full lines, the stow-away unit resides beneath the overhanging structure 48, which may represent an instrument panel or an electronic instrument which is controlled by the stow-away unit 7. In its retracted position, the unit 7 resides downwardly and forwardly of the seat 47 in a position clear of the operator's feet. The single slide may be anchored near the vertical center of the seat and connected to the bottom of the unit 7, as indicated in Figure 2.

It will be noted that the slide assembly in this installation has a greater angle of circular motion than the structure shown in Figures 1 and 3. In order to create the increased angle, the slide assembly is provided with two intermediate tracks, as indicated at 2 and 2a. The stationary track, which includes the mounting plate 4, is attached to the support structure 6 as described earlier. The slide assembly illustrated diagrammatically in Figure 14 is similar in all other respects to that shown in Figures 1–5 and may include the counter springs and latch structure as shown therein, or it may include the friction type latch shown in Figures 11–13, omitting the counter springs.

Figure 15 represents diagrammatically the cross section of a fuselage 50, with the slide assembly installed to shift the unit 7 laterally in a path which corresponds to the curved fuselage profile. In this instance, the stationary track 1 is attached in an overhead position to the element 6 which extends from the upper portion of the fuselage. In its extended position, the unit may be suspended at one side of the operator's seat 47; in its retracted position, as shown in broken lines, the instrument is elevated to a plane above the seat. This installation may be employed where it is necessary to provide access to a door or window alongside the seat or to provide access to another instrument adjacent one side of the seat.

Double slide installation

Figure 17:
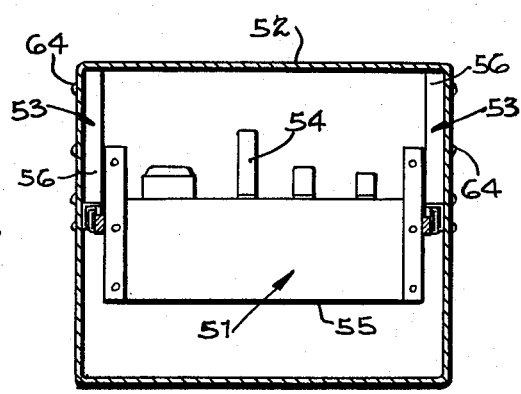
Figure 17 is a sectional view, taken along line 17—17 of Figure 16, further detailing the slide arrangement.
Figure 18:
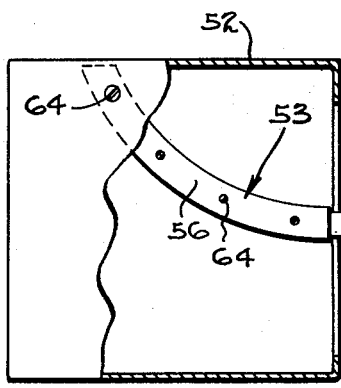
Figure 18 is a side elevation, similar to Figure 16, showing the electronic instrument in its extended position.

A typical double slide installation is shown in Figures 16–20, in which an electronic instrument 51 is mounted for motion through a curved path with respect to a cabinet 52. The slide assembly, indicated generally at 53, comprises three track sections in duplicate at opposite sides of the cabinet, as shown in Figure 17. In the extended position shown in Figure 18, the instrument 51 is supported in cantilever fashion, with the tubes and other components as shown at 54, exposed for servicing at one side; the wiring and associated components are exposed at the opposite side, as indicated at 55.

Figure 20:
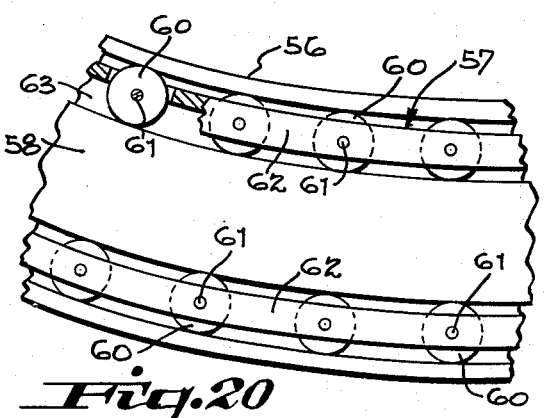
Figure 20 is a side elevation of the slide, as viewed along line 20—20 of Figure 19.
Figure 19:
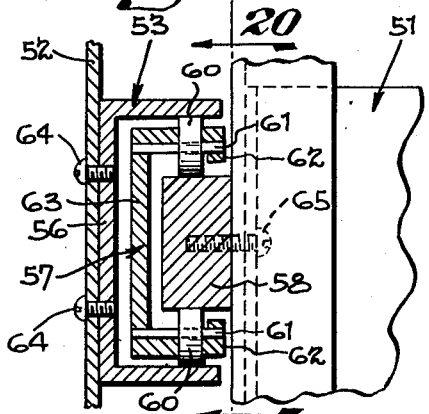
Figure 19 is an enlarged fragmentary cross section taken along line 19—19 of Figure 16, detailing the construction of the modified slide.

The slide structure is of modified design comprising a stationary channel 56, an intermediate channel 57 and a forward track 58 in the form of a solid bar. In this assembly, the curvature is imparted to the tracks in a plane at right angles to that disclosed previously, such that the flanges of the channels reside in a horizontal plane and bear the weight load. As best shown in Figures 19 and 20, each slide assembly includes a set of rollers 60 journalled upon pins 61 which project through the inner flange 62 and web 63 of the intermediate track 57. The rollers thus carry the weight load from the forward track 58 to the side flanges of the stationary track 56.

As shown in Figure 19, the stationary track 56 may be attached directly to the wall of the cabinet by the screws 64. The forward track 58 has its outward portion secured directly to the sides of the instrument 51 by the screws 65. As the instrument 51 is shifted outwardly, the rolling motion of the rollers cause the intermediate track 57 to advance at half the rate of the forward track 58. In the extended position, the rearward portions of the tracks are telescopically nested within one another to support the load in the cantilever fashion.

Having described my invention, I claim:

The combination of an instrument having a cabinet adapted to be stored in a stow-away position adjacent a wall or to be turned through a maximum angle of ninety degrees and placed into a position of normal use remote from said wall, and a slide structure, said slide structure comprising: a stationary slide member formed with means for securing it to said wall, an intermediate slide member, and a forward slide member, said slide members being curved lengthwise through a continuous arc and telescopically interfitted with each other so that the forward slide member projects outwardly from the intermediate slide member and the intermediate slide member projects outwardly from the stationary slide member, opposed surfaces of the stationary and intermediate slide members being formed to define first ball races, a first plurality of ball bearings in said first races, opposed surfaces of the intermediate and forward slide members being formed to define second ball races, a second plurality of ball bearings in the second races, the forward and intermediate slide members being formed with spaced lugs at their inner and outer ends respectively, a first tension spring secured between said lugs for urging the forward slide member outwardly into extended position, the intermediate and stationary slide members being formed with spaced lugs at their inner and outer ends, respectively, a second tension spring secured between the last-mentioned lugs for urging the intermediate slide member outwardly, a latch for securing the forward and intermediate slide members in extended position, and means for securing the outer end of the forward slide to said cabinet so that the cabinet may be supported and guided by the slide members from the stow-away position through a curved path to the extended position of normal usage or retracted to its storage position.

References Cited in the file of this patent

FOREIGN PATENTS

| | | |
|---|---|---|
| 768,611 | France | May 22, 1934 |
| 774,014 | Great Britain | May 1, 1957 |